(12) United States Patent
Asanuma

(10) Patent No.: US 9,626,013 B2
(45) Date of Patent: Apr. 18, 2017

(54) IMAGING APPARATUS

(71) Applicant: SONY MOBILE COMMUNICATIONS INC., Minato-ku (JP)

(72) Inventor: Itsuki Asanuma, Kanagawa (JP)

(73) Assignees: Sony Corporation, Tokyo (JP); Sony Mobile Communications Inc., Tokyo (JP)

(*) Notice: Subject to any disclaimer, the term of this patent is extended or adjusted under 35 U.S.C. 154(b) by 302 days.

(21) Appl. No.: 13/673,101

(22) Filed: Nov. 9, 2012

(65) Prior Publication Data

US 2013/0141362 A1 Jun. 6, 2013

Related U.S. Application Data

(60) Provisional application No. 61/566,846, filed on Dec. 5, 2011.

(51) Int. Cl.
| | | |
|---|---|---|
| *G06F 3/041* | (2006.01) | |
| *G06F 3/0484* | (2013.01) | |
| *G06F 3/0354* | (2013.01) | |
| *G06F 3/0488* | (2013.01) | |

(52) U.S. Cl.
CPC .......... *G06F 3/041* (2013.01); *G06F 3/03547* (2013.01); *G06F 3/0488* (2013.01); *G06F 3/04845* (2013.01)

(58) Field of Classification Search
CPC .. G06F 3/03547; G06F 3/041; G06F 3/04845; G06F 3/0488
USPC .............................................. 345/7, 170–174
See application file for complete search history.

(56) References Cited

U.S. PATENT DOCUMENTS

| | | | | |
|---|---|---|---|---|
| 8,203,502 | B1* | 6/2012 | Chi et al. ........................... | 345/7 |
| 2010/0188353 | A1* | 7/2010 | Yoon .................... | G06F 3/04883 345/173 |
| 2011/0029917 | A1* | 2/2011 | Um .............................. | 715/800 |
| 2012/0007822 | A1* | 1/2012 | Luo ........................ | G06F 3/041 345/173 |
| 2012/0030634 | A1* | 2/2012 | Miyazaki ............ | G06F 3/04847 715/863 |
| 2012/0069231 | A1* | 3/2012 | Chao .................... | G06F 3/04883 348/333.01 |
| 2012/0092509 | A1* | 4/2012 | Kim ..................... | G06F 3/04817 348/207.1 |
| 2012/0206396 | A1* | 8/2012 | Kitabayashi .................. | 345/173 |

(Continued)

FOREIGN PATENT DOCUMENTS

JP 2004-64205 2/2004

*Primary Examiner* — Tony Davis
(74) *Attorney, Agent, or Firm* — Oblon, McClelland, Maier & Neustadt, L.L.P.

(57) ABSTRACT

An information processing apparatus that includes an imaging unit that captures an image of a subject, a display, provided on a first surface of the information processing apparatus, that displays the image of the subject, and a touch panel, provided on a second surface of the information processing apparatus, that detects a touch input, the second surface being a surface opposite to the first surface. The information processing apparatus further including a controller that receives an output from the touch panel corresponding to the touch input and outputs a command to control at least one of the imaging unit and the display based on the touch input.

24 Claims, 8 Drawing Sheets

(56) References Cited

U.S. PATENT DOCUMENTS

2012/0212445 A1\* 8/2012 Heikkinen et al. ............ 345/174
2012/0315954 A1\* 12/2012 Ahn ...................... G06F 1/1694
                                                                                  455/556.1

\* cited by examiner

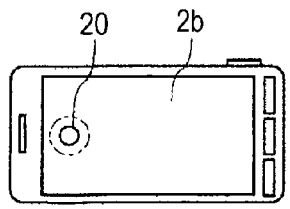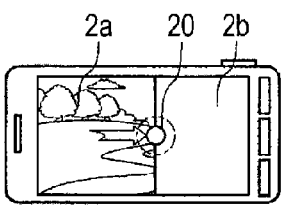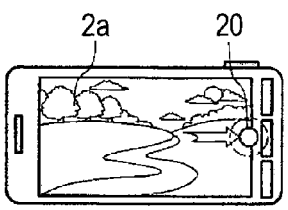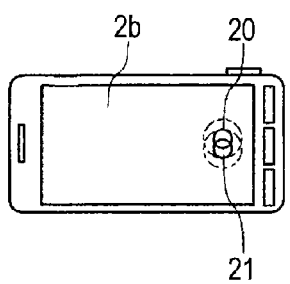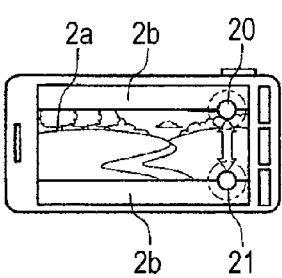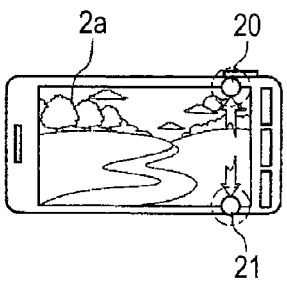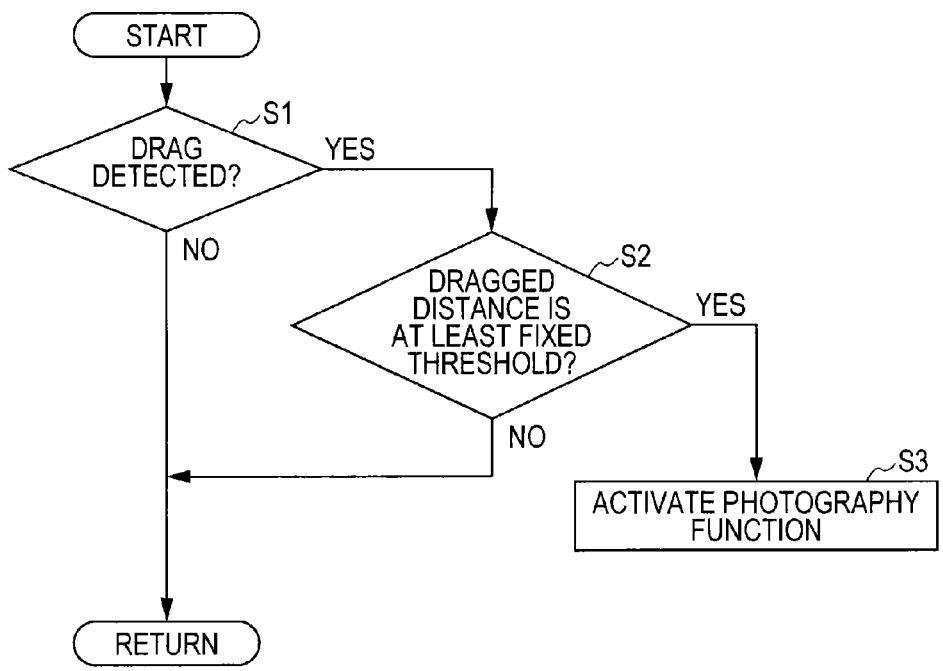

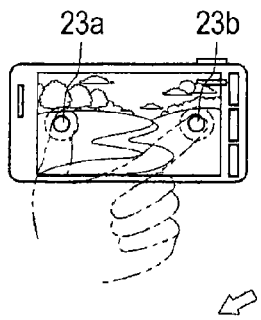 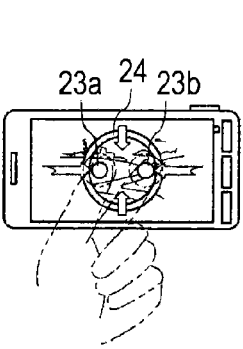 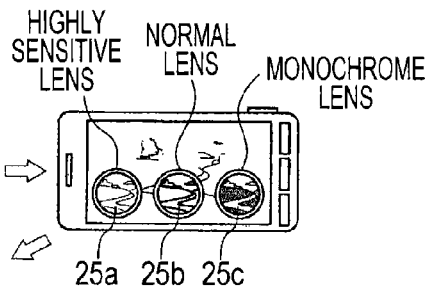
FIG. 7A  FIG. 7B  FIG. 7C
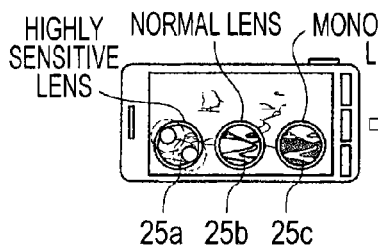 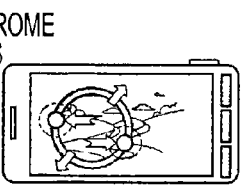 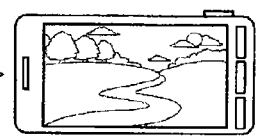
FIG. 7D  FIG. 7E  FIG. 7F
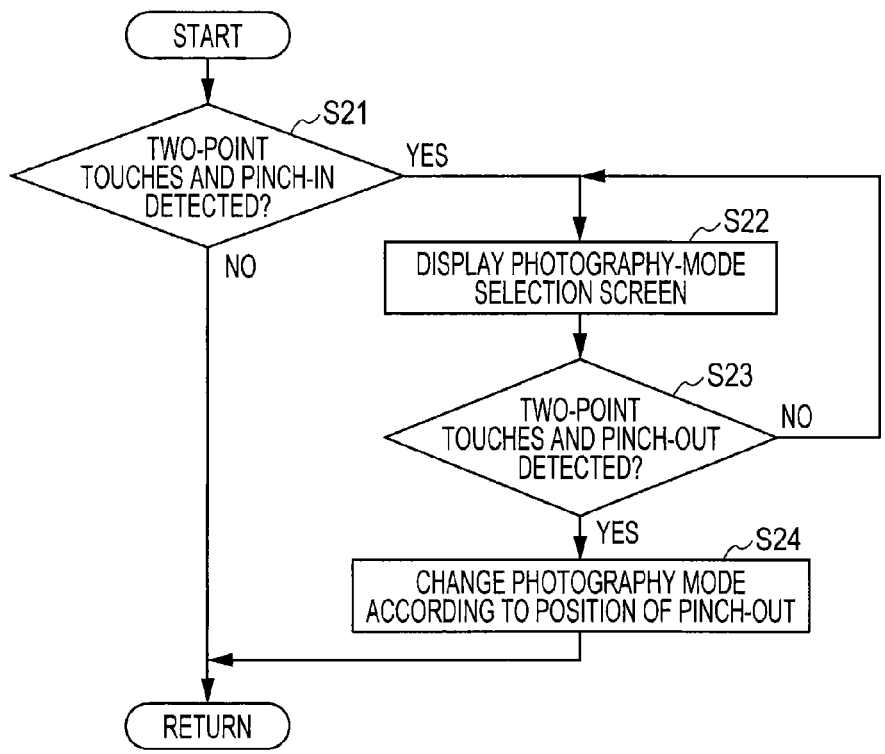
FIG. 8

FIG. 11A  FIG. 11B  FIG. 11C
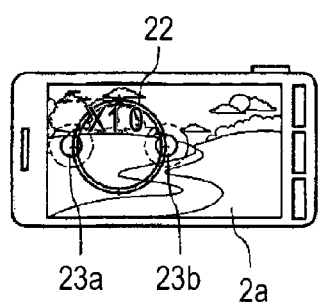 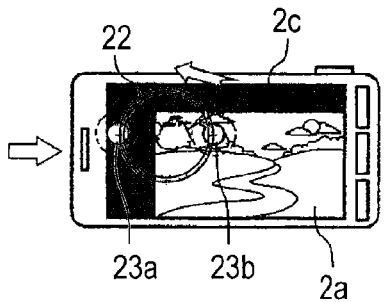 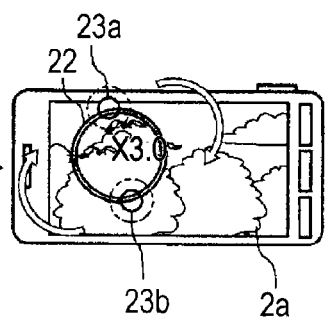
FIG. 12A  FIG. 12B  FIG. 12C
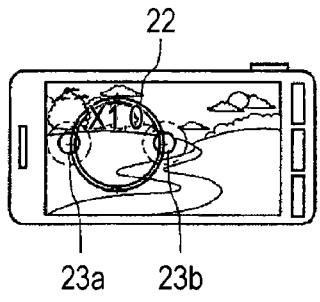 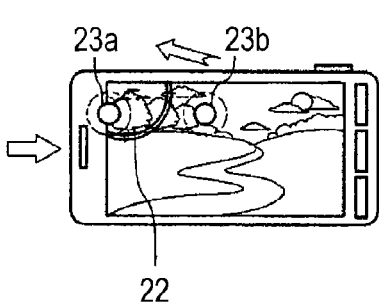 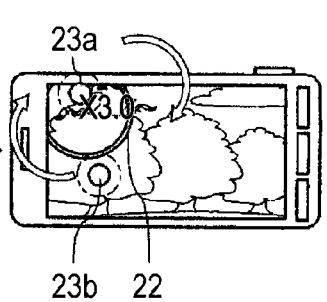

IMAGING APPARATUS

CROSS REFERENCE TO RELATED APPLICATION

The present application claims the benefit of the earlier filing date of U.S. Provisional Patent Application Ser. No. 61/566,846 filed on Dec. 5, 2011, the entire contents of which is incorporated herein by reference.

BACKGROUND

Field of the Disclosure

This disclosure relates to an imaging apparatus on which various operations can be carried out by using the front surface of a case as a view finder and by using the rear surface as a touch panel.

Description of Related Art

Recently, touch panels that display an image on a screen and can be operated by an operator by directly touching the screen are widely being used in various information processing terminals, so prices of touch panels supplied in large quantities have dropped. These information processing terminals include terminals called smart phones, which enable users to perform intuitive operations, so a touch panel is an essential component. Information processing terminals such as smart phones have not only a telephone function and imaging function but also other various functions used for Internet browsing, file editing, and the like.

With a conventional information processing terminal, a display unit, which displays images, icons, and the like on a screen and is used by the user as a view finder, and a touch panel, on which the user carries out touch operations with fingers, a stylus pen, and the like, are formed on the same surface. When imaging a subject, the user has executed a camera application by touching an icon or the like to enable an imaging function, after which the user has took a picture of the subject by touching, for example, an icon displayed on the touch panel while viewing the display unit. An exemplary operation carried out during imaging is to change an imaging parameter by moving an icon displayed on the touch panel.

SUMMARY

As described above, since the touch panel is also used as the view finder, an image displayed on the screen of the touch panel has sometimes been hindered by a hand of the user itself, making it hard for the user to view the subject. Accordingly, an information processing terminal has been proposed that has a touch panel not only on the front surface but also on the rear surface so that operations carries out on the touch panel on the rear surface. With this type of information processing terminal, the image displayed on the display unit is not hindered by the hand of the user itself. Since, however, imaging operations carried out on the touch panel on the rear surface differ from operations on conventional cameras, the user cannot operate the information processing terminal in an intuitive manner in many cases. Accordingly, an information processing terminal on which the user can perform imaging operations in a more intuitive manner has been demanded.

According to a first exemplary embodiment, the disclosure is directed to an information processing apparatus that includes an imaging unit that captures an image of a subject, a display, provided on a first surface of the information processing apparatus, that displays the image of the subject, and a touch panel, provided on a second surface of the information processing apparatus, that detects a touch input, the second surface being a surface opposite to the first surface. The information processing apparatus further including a controller that receives an output from the touch panel corresponding to the touch input and outputs a command to control at least one of the imaging unit and the display based on the touch input.

According to another exemplary embodiment, the disclosure is directed to a method performed by an information processing apparatus. The method includes capturing, by an imaging unit, an image of a subject; displaying, by a display provided on a first surface of the information processing apparatus, the image of the subject; detecting, by a touch panel provided on a second surface of the information processing apparatus, a touch input, the second surface being a surface opposite to the first surface; receiving, at a controller of the information processing apparatus, an output from the touch panel corresponding to the touch input; and outputting, by the controller, a command to control at least one of the imaging unit and the display based on the touch input.

According to another exemplary embodiment, the disclosure is directed to a non-transitory computer-readable medium including computer program instructions, which when executed by an information processing apparatus, cause the information processing apparatus to perform a method. The method comprising capturing an image of a subject; displaying, by a display provided on a first surface of the information processing apparatus, the image of the subject; detecting, by a touch panel provided on a second surface of the information processing apparatus, a touch input, the second surface being a surface opposite to the first surface; and outputting a command to control at least one of the imaging unit and the display based on the touch input.

According to this disclosure, since an imaging operation command is given to the imaging unit when the second-surface detector, which is provided on the second surface disposed on the rear surface of the first surface, is operated, a subject image to be displayed on the display unit can be changed. Therefore, the photographer can take a picture of the subject without hindering the screen on the display unit with a hand. Since intuitive operations, which have been used for conventional cameras, are possible, operability during imaging is improved.

BRIEF DESCRIPTION OF DRAWINGS

FIGS. 3A-3F illustrate a specific operational procedure for activating an imaging function of the imaging apparatus in the embodiment of this disclosure.

FIG. 4 is a flowchart illustrating an example of a process to activate the imaging function of the imaging apparatus in the embodiment of this disclosure.

FIGS. 7A-7F illustrate a specific operational procedure for changing a photography mode in the embodiment of this disclosure.

FIG. 8 is a flowchart illustrating an example of a process to change a photography mode in the embodiment of this disclosure.

FIGS. 11A-11C illustrate a first operation example in which the zooming of an image displayed at an edge of a screen in the embodiment of this disclosure is changed.

FIGS. 12A-12C illustrate a second operation example in which the zooming of an image displayed at an edge of the screen in the embodiment of this disclosure.

DETAILED DESCRIPTION

Figure 1A:
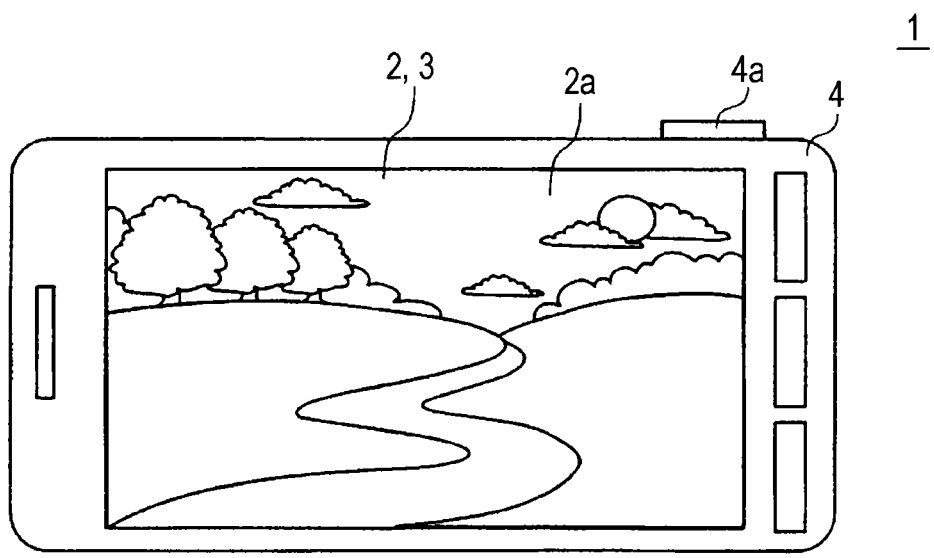
FIGS. 1A-1B are a front view and a rear view illustrating an example of the external structure of an imaging apparatus in an embodiment of this disclosure.

An embodiment in this disclosure will be described in the following order.
1. Embodiment (example of an operation in which a touch panel on a rear surface is used)
2. Variation

1. Embodiment

Example of an Operation in which a Touch Panel on a Rear Surface is Used

An embodiment in this disclosure will be described with reference to the attached drawings.

As for this embodiment, an example will be described that is applied to an imaging apparatus 1, which has a display unit 2 used as a view finder on the front surface of a case 4 and also includes a rear touch panel 6 and a lens optical system 5 on the rear surface of the case 4. The imaging apparatus 1 implements an imaging method executed by internal blocks, described later, in cooperation with one another when a computer executes a program. Accordingly, the imaging apparatus 1 not only can be used as a standalone camera, but also can be executed as part of various functions included in an information processing terminal such as a smart phone. First, an example of the structure of the imaging apparatus 1 will be described.

Figure 1B:
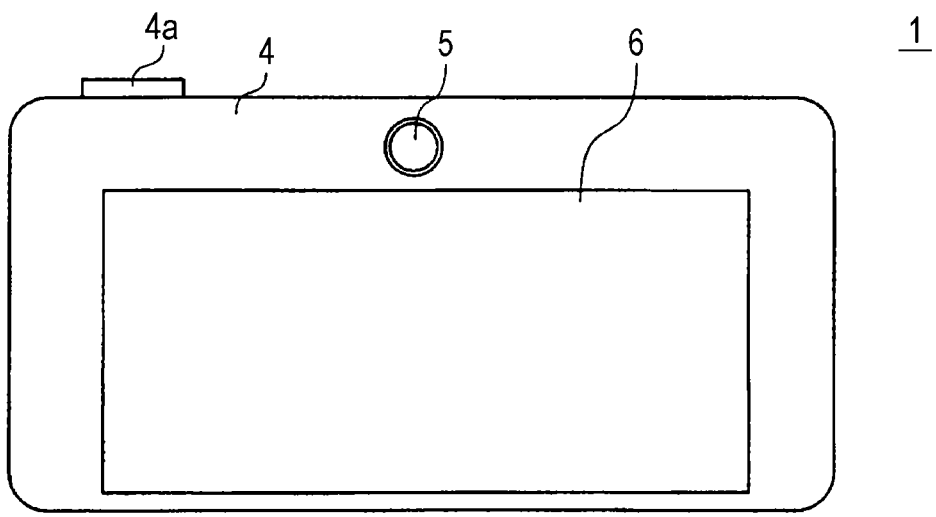

FIG. 1 illustrates an example of the external structure of the imaging apparatus 1 in this embodiment. FIG. 1A is a front view of the imaging apparatus 1, and FIG. 1B is a rear view of the imaging apparatus 1.

The imaging apparatus 1 includes the case 4, which has a first surface (referred to below as the front surface) and a second surface (referred to below as the rear surface), which is the rear surface opposite to the first surface. The imaging apparatus 1 also includes, on the front surface of the case 4, the display unit 2 that displays an image of a subject and a front touch panel 3 used as a first-surface detector that detects contact points with which objects (such as, for example, fingers and a stylus pen) are in contact. The imaging apparatus 1 also includes a rear touch panel 6, disposed on the rear surface of the case 4, which is used as a second-surface detector that detects contact points with which objects are in contact. Capacitive sensors are used as contact sensors on the front touch panel 3 and rear touch panel 6, for example. Contact points of fingers of the photographer and the like can be detected at a plurality of points (five points, for example).

The imaging apparatus 1 has, at the top of the case 4, a photography button 4a, which is used by the photographer to make a command to start photography. The imaging apparatus 1 has an imaging unit 7, at the top of the rear surface, which includes an imaging device and the lens optical system 5. The imaging unit 7 fetches image light of a subject to which the lens optical system 5 is oriented, and the imaging device outputs an image of the subject. A complementary metal oxide semiconductor (CMOS) sensor or a charge coupled device (CCD) image sensor is used as the imaging device, for example. Although the lens optical system 5 is preferably located near the center at the top of the rear surface of the case 4, the lens optical system 5 may be located at a position shifted to the right or left.

As illustrated in FIGS. 1A and 1B, the display unit 2 and the operation area of the rear touch panel 6 have the same horizontal length, but the display unit 2 has a longer vertical length than the operational area of the rear touch panel 6. Although it is desirable that there be a match between the vertical position at which the rear touch panel 6 is pressed and the vertical position of the display unit 2, a strict match is not obtained because there is the imaging unit 7 on the rear surface of the imaging apparatus 1. If the photographer operates the imaging apparatus 1 with a finger or another object that comes into contact with the rear touch panel 6 in a wide area, a difference between the vertical positions is very small and it is not thought to affect the operability.

As described above, when the photographer operates the front touch panel 3 to operate the imaging apparatus 1, the screen is hidden by a finger; when the photographer operates the rear touch panel 6, however, the screen is not hidden by the finger, enabling more precise operations to be carried out. Therefore, the photographer can view the screen on the display unit 2 without the screen being hindered by the finger, increasing visibility. In FIG. 1A, for example, a subject (landscape, for example) is displayed on a subject display area 2a included in the display unit 2, and the subject display area 2a is not hindered by a finger or another object. Accordingly, it is possible to achieve high visibility and usability to the photographer. The lens optical system 5 may be placed next to the rear touch panel 6 or may be placed inside the rear touch panel 6 within a range in which operability is not affected.

Figure 2:
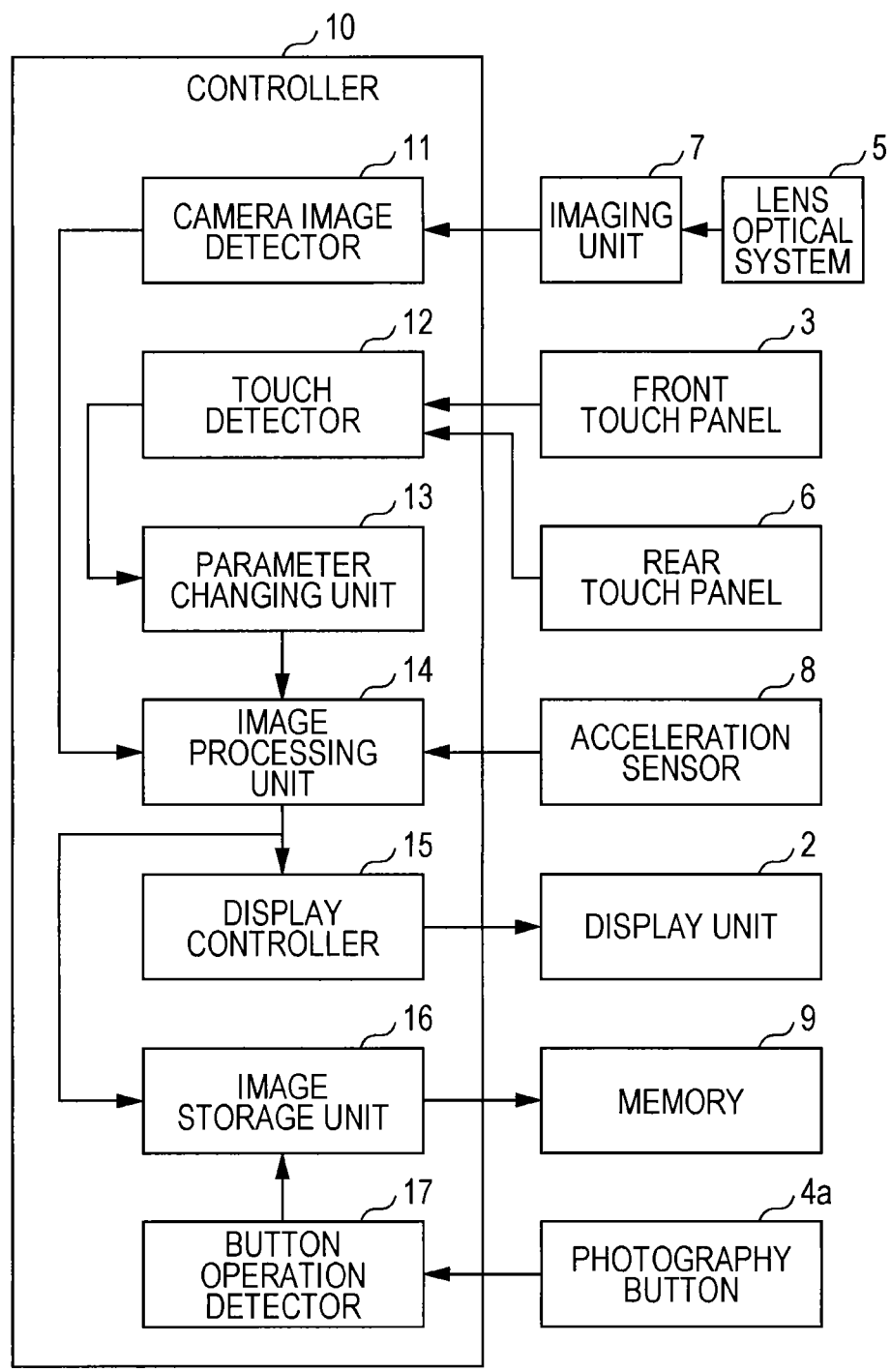
FIG. 2 is a block diagram illustrating an example of the internal structure of the imaging apparatus in the embodiment of this disclosure.

FIG. 2 shows an example of the internal structure of the imaging apparatus 1.

In addition to the components (imaging unit 7, front touch panel 3, etc.) described above, the imaging apparatus 1 includes a controller 10. The controller 10 receives a distance between two contact points (two-point touches) of at least two objects and the positions of the two contact points from the rear touch panel 6 and gives an operation command to the imaging unit 7 according to changes in the received distance and positions so that an image to be displayed on the display unit 2 is changed.

The controller 10 has a camera image detector 11 that detects a camera image from image signals received from the imaging unit 7. The controller 10 also has a touch detector 12 used as a pressure detector that detects the position of a contact point of an object according to which an operation command is made by the rear touch panel 6 from signals received from the front touch panel 3 and rear touch panel 6. When an object moves while being in contact with the front touch panel 3 or rear touch panel 6 as described later, the touch detector 12 detects that a rotational operation or sliding operation has been performed, according to the rotated angle or traveled distance. The touch detector 12 can also detect traveled distances or rotated angles among two points or more (multiple points). In the description below, the action to move an object on the rear touch panel 6 while keeping the object in contact with the rear touch panel 6 will be referred to as a drag.

The controller 10 also has a parameter changing unit 13 and an image processing unit 14. The parameter changing unit 13 changes various parameters used for a subject image displayed on the display unit 2 according to the positions of the contact points and the change in the positions, which are brought by the operation detected by the touch detector 12. The image processing unit 14 adds a prescribed process to the subject image according to the parameter changed by the parameter changing unit 13. Parameters changed by the parameter changing unit 13 include a zoom ratio of the imaging unit 7, focusing, and aperture adjustment, for example. The image processing unit 14 determines a representation, a special effect, and the like for an image to be displayed on the display unit 2. The image processing unit 14 also carries out a process to change the orientation of characters or the like to be displayed on the display unit 2 according to the direction of the acceleration of gravity received from an acceleration sensor 8 that detects the acceleration applied to the case 4.

The controller 10 also has a display controller 15 that displays, on the display unit 2, the subject image to which the prescribed process has been added. The display controller 15 is used as a display driver that drives the display unit 2 to display the image received from the image processing unit 14 on the display unit 2. Examples of the display unit 2 include a liquid crystal display and an electro luminescence (EL) display.

The controller 10 also includes an image storage unit 16 that stores the image received from the image processing unit 14 into a memory 9, and also has a button operation detector 17 that detects a command to operate the photography button 4a as a button operation. The image storage unit 16 is used as a memory driver; upon receipt of the command to operate the photography button 4a from the button operation detector 17, the memory driver writes an image received from the image processing unit 14 at the time when the operation command was received in the memory 9 in a prescribed format. An example of this format is the Exchangeable Image File Format (Exif). An example of the memory 9 is an erasable flash memory. The memory 9 may be included in the imaging apparatus 1 or may be a replaceable card type of memory.

[(1) Example of an Operation to Activate an Imaging Function]

Next, an example of an operation to activate an imaging function will be described with reference to FIGS. 3 and 4.

FIG. 3 illustrates a specific operational procedure for activating the imaging function of the imaging apparatus 1. Here, an action by the photographer to touch the rear touch panel 6 with a single object (a finger, for example) is referred to as a single touch, and an action by the photographer to touch the rear touch panel 6 with two or more objects is referred to as multiple touches. FIGS. 3A to 3C illustrate an example in which the imaging function is activated with a single touch, and FIGS. 3D to 3F illustrate an example in which the imaging function is activated with multiple touches. To indicate the contact of an object on the rear touch panel 6, a mark or the like may be displayed on part of the display unit 2 in correspondence to the position with which the object has come into contact.

In the example of the operation with a single touch illustrated in FIGS. 3A to 3C, the controller 10 contracts an application display area 2b (first display area) displayed on the display unit 2 with the imaging unit 7 placed in a non-operated state in a direction in which the contact point moves on the rear touch panel 6. The controller 10 then performs control so that a subject display area 2a (second display area) in which to display the subject image on the display unit 2 is expanded.

Specifically, the imaging apparatus 1 operates as follows. First, it is assumed that the application display area 2b on which images by various application programs are displayed has been displayed on the display unit 2 (FIG. 3A). Next, the photographer touches the left edge of the display unit 2 (right edge of the rear touch panel 6) with a finger and slides the finger to the right (FIG. 3B). The contact point 20 then moves to the right when viewed from the front surface, and the application display area 2b and the subject display area 2a, on which to display the subject image fetched from the imaging unit 7, are displayed in the image display area of the display unit 2 side by side, with the perpendicular direction passing the contact point 20 taken as a boundary line. When the contact point 20 is further moved, the boundary line also moves according to this operation, contracting the application display area 2b and expanding the subject display area 2a. When the finger of the photographer reaches the right edge (left edge of the rear touch panel 6) of the display unit 2, the subject display area 2a is displayed in the entire image display area of the display unit 2 (FIG. 3C).

In the example of the operation with multiple touches illustrated in FIGS. 3D to 3F, the controller 10 carries out control so that the subject display area 2a (second display area) is expanded in a direction in which the two contact points are separated apart from each other and that the subject display area 2a (second display area) is contracted with the imaging unit 7 placed in the non-operated state.

Specifically, the imaging apparatus 1 operates as follows. The photographer touches a portion near the center in the perpendicular direction of the display unit 2 (near the center in the perpendicular direction of the rear touch panel 6) with two fingers (the thumb and index finger, for example) and then expands the spacing between the fingers in the perpendicular direction (FIG. 3D). Then, the subject display area 2a is displayed in an area between the boundary lines of the contact points 20 and 21, the boundary lines being in the horizontal direction of the contact points 20 and 21, and the application display area 2b is displayed above and below the boundary lines of the contact points 20 and 21 (FIG. 3E). When the two fingers reach the upper edge and lower edge of the display unit 2 (upper edge and lower edge of the rear touch panel 6), the subject display area 2a is displayed in the entire image display area of the display unit 2 (FIG. 3F).

FIG. 4 illustrates an example of a process to activate the imaging function of the imaging apparatus 1.

First, the touch detector 12 determines whether a drag by an object in contact with the rear touch panel 6 has been detected (step S1). If a drag has not been detected, the sequence returns to Start.

If the touch detector 12 has detected a drag, the touch detector 12 determines whether a dragged distance is at least a fixed threshold (1 to 2 cm, for example) (step S2). If the dragged distance is at least the fixed threshold, the touch detector 12 sends a command to activate the photography function to the parameter changing unit 13 (step S3). Then, the parameter changing unit 13 sends a preset parameter to the image processing unit 14, and displays an image that the image processing unit 14 acquired from the camera image detector 11 on the display unit 2 through the display controller 15. When the photography function is placed in a state in which the photography function has been effectively activated, a stand-by state is entered in which photography is always ready. If the dragged distance is determined to be equal to or less than the fixed threshold in step S2, the sequence returns to Start.

Thus, when the photographer operates the rear touch panel 6 in the same way as when the photographer opens the lens cover of a conventional camera, the photographer can intuitively activate the photography function. Since the hand of the photographer does not hide the image displayed on the display unit 2, the photographer can quickly start photography at a time that the photographer has in mind. The lens cover may not be actually attached to the imaging apparatus 1, so it is also possible to reduce the thickness of the case 4 and the weight of the imaging apparatus 1.

[(2) Operation During Photography: Example of an Operation to Zoom a Subject Image]

Next, an example of an operation to zoom a subject image will be described with reference to FIGS. 5 and 6.

FIG. 5 illustrates a specific operational procedure for zooming a subject image. FIGS. 5A and 5B illustrate an example to zoom a subject image located at the center of the display unit 2, and FIGS. 5C and 5D illustrate an example of an operation to zoom a subject image located on the left side of the display unit 2.

The controller 10 displays a substantially circular indicator 22, the diameter of which is the distance between two contact points at positions at which the two contact points face each other on the display unit 2, according to the two contact points. The indicator 22 is used to adjust photography parameters for the zoom ratio, focusing, aperture adjustment, and the like. The controller 10 changes the display (numerical value) of the indicator 22 according to the direction in which the two contact points are rotated, and then carries out zooming in or out, centered around the image located near the center of the two contact points. The controller 10 then performs control so that the zoomed-in or zoomed-out subject image is displayed on the display unit 2.

Figure 5A:
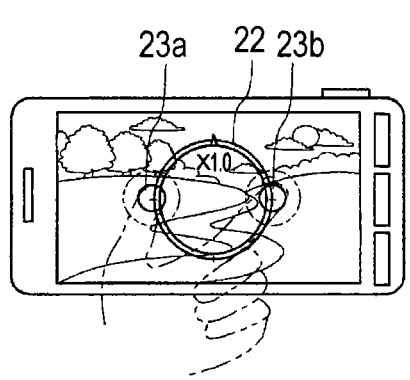
FIGS. 5A-5D illustrate a specific operational procedure for zooming a subject image in the embodiment of this disclosure.

Specifically, the imaging apparatus 1 operates as described below. When the photographer touches the center of the display unit 2 (center of the rear touch panel 6) with two fingers, the circular indicator 22, the diameter of which is the distance between the contact points 23a and 23b of the two fingers, is superimposed on an image displayed on the display unit 2 (FIG. 5A). The contact points 23a and 23b may or may not be displayed on the display unit 2. If the photographer is a beginner, however, when a setting is made so that the contact points 23a and 23b are displayed on the display unit 2, a position at which the indicator 22 is rotated becomes easy to grasp. If the photographer is not a beginner, the photographer feels the contact points 23a and 23b displayed on displayed to be burdensome, so a setting may be made to hide the contact points 23a and 23b.

If the contact points 23a and 23b are not spaced apart by a prescribed distance, the touch detector 12 incorrectly detects a single contact. Accordingly, it is desirable that the contact points 23a and 23b be spaced apart by the prescribed distance (2 to 4 cm, for example).

Figure 5B:
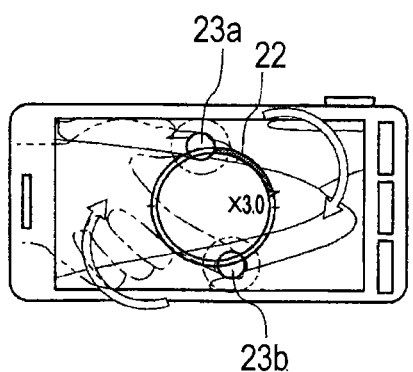

When the zoom ratio is 1 at the initial display of the indicator 22, "×1.0" is displayed in the indicator 22. If the photographer rotates the two fingers clockwise when viewed from the front surface (counterclockwise when viewed from the rear surface), the indicator 22 rotates clockwise and the zoom ratio is changed according to the angle of the rotation; "×3.0" is displayed as illustrated in FIG. 5B. The zoomed subject image is displayed on the display unit 2 according to the change in the zoom ratio in the indicator 22.

Figure 5C:
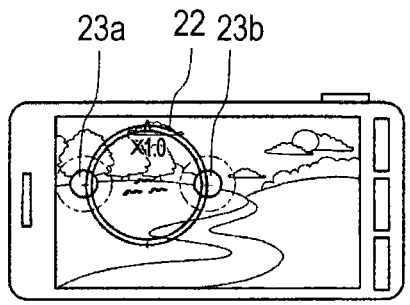
Figure 5D:
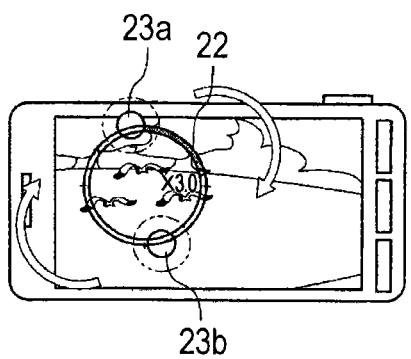

If the photographer touches the left side of the display unit 2 (right side of the rear touch panel 6) with the two fingers, the indicator 22 is displayed on the left side of the display unit 2 (FIG. 5C). If the photographer then rotates the two fingers clockwise when viewed from the front surface (counterclockwise when viewed from the rear surface), the image included at the center of the indicator 22 is zoomed and the zoomed image is displayed on the display unit 2 (FIG. 5D). After having zoomed the image, the photographer can move the indicator 22 and zoomed image displayed on the display unit 2 by moving the two fingers while keeping the two fingers in contact with the rear touch panel 6.

Figure 6:
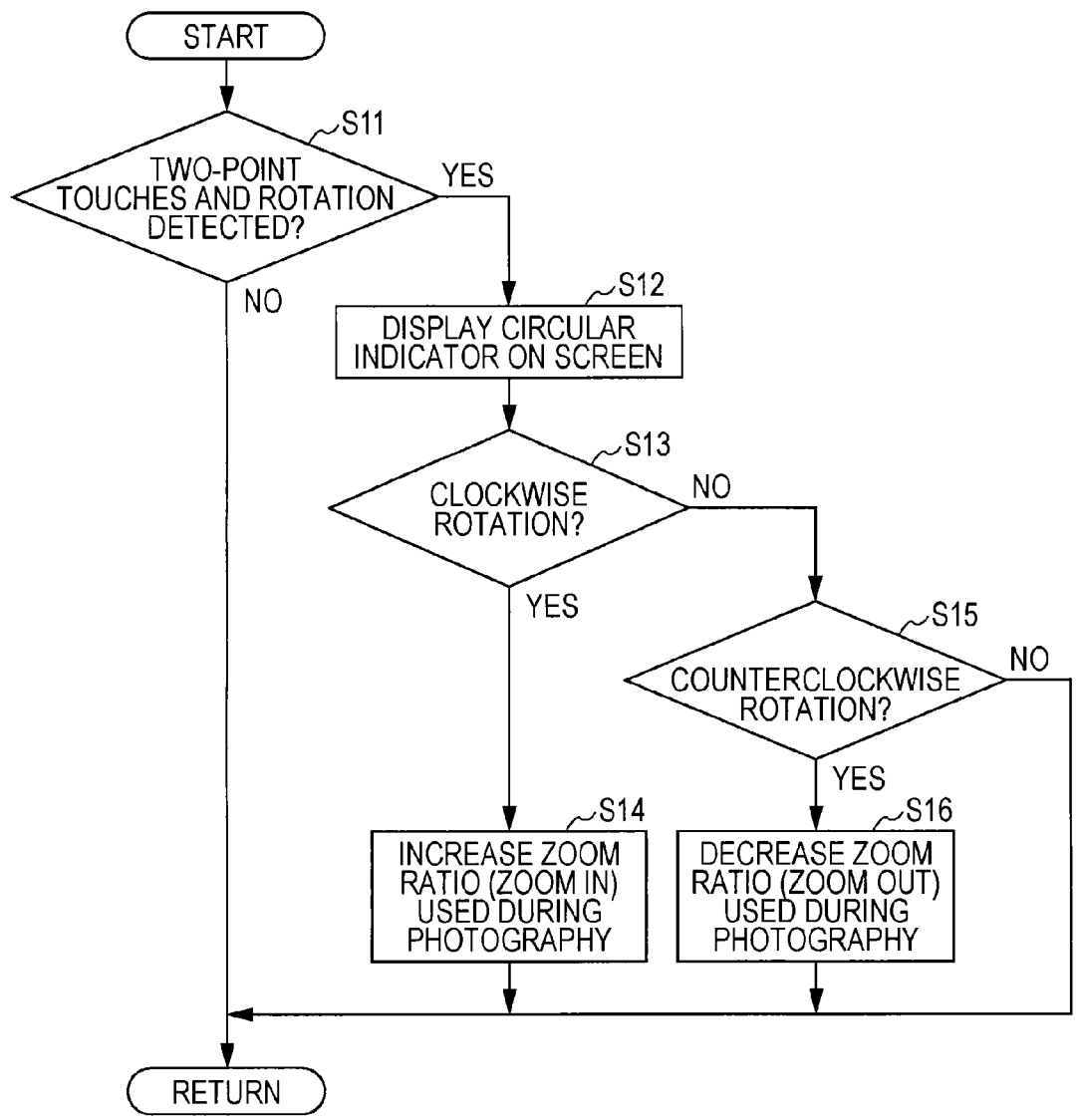
FIG. 6 is a flowchart illustrating an example of a process to zoom a subject image in the embodiment of this disclosure.

FIG. 6 illustrates an example of a process to zoom a subject image.

First, the touch detector 12 detects whether objects have come into contact with the rear touch panel 6 at two points and an operation to rotate the objects has been performed (step S11). If an object has not come into contact, nor have an operation to rotate the object been performed, the sequence returns to Start.

If objects come into contact with two points on the rear touch panel 6 and an operation to rotate the object has been performed, the touch detector 12 notifies, through the parameter changing unit 13, the image processing unit 14 of a command to display the indicator 22 on the display unit 2. The indicator 22 is then displayed on the display unit 2 by the display controller 15 (step S12).

Next, the touch detector 12 detects whether the indicator 22 has been rotated clockwise, when viewed from the front surface of the display unit 2, due to the rotation of the two contact points 23a and 23b (step S13). If the clockwise rotation of the indicator 22 has been detected, the parameter changing unit 13 performs a process to increase the zoom ratio (zoom in) used during photography (step S14), and the display controller 15 displays the zoomed image on the display unit 2.

If the touch detector 12 does not detect the clockwise rotation of the indicator 22 when viewed from the front surface of the display unit 2 in step S13, then the touch detector 12 detects whether the indicator 22 has been rotated counterclockwise, when viewed from the front surface of the display unit 2, due to the rotation of the two contact points 23a and 23b (step S15). If the counterclockwise rotation of the indicator 22 has been detected, the parameter changing unit 13 performs a process to decrease the zoom ratio (zoom out) used during photography (step S16), and the display controller 15 displays a panned image on the display unit 2. If the touch detector 12 detects that the indicator 22 has not been rotated in either direction, the touch detector 12 decides that the photographer has not performed any operation and the sequence returns to Start.

As described above, when the photographer touches the rear touch panel 6 with two fingers during the execution of the imaging function, the indicator 22 is displayed at a position, on the display unit 2, that corresponds to the touched portion. When the fingers are rotated in this state to move the indicator 22, the zoom ratio can be precisely changed. Therefore, an operation such as the rotating of the lens of a single-lens reflex camera or the like can be achieved with the rear touch panel 6. This not only allows the photographer to perform an intuitive operation but also does not hinder photography because the screen is not hidden by the hand. There is also no need to mount physical buttons on the terminal. The indicator 22 may be assigned not only to zoom adjustment but also to focusing, aperture adjustment, and other functions.

The controller 10 can also perform another type of zoom-in or zoom-out control. For example, upon detection of one or two contact points, the controller 10 takes the position of the one contact point or the central position between the two contact points as a fixed point, and maintains a state in which the indicator 22 centered around the fixed point is displayed on the display unit 2. The controller 10 then changes the display of the indicator 22 according to the direction in which the two contact points are rotated, and performs control under which the subject image that has been zoomed in or out centered around the image located near the center of the two contact points is displayed on the display unit 2. Thus, even if the photographer releases the fingers from the indicator 22, the position of the indicator 22 is fixed, so the photographer can precisely grasp the position of the subject to be zoomed.

[(3) Operation During Photography: Example of an Operation to Change a Photography Mode]

Next, an example of an operation to change a photography mode will be described with reference to FIGS. 7 and 8.

FIG. 7 illustrates a specific operational procedure for changing a photography mode.

When the photographer touches the center of the display unit 2 (center of the rear touch panel 6) with two fingers (FIG. 7A) and then performs an operation to reduce the distance between the contact points 23a and 23b of the two fingers, a circular indicator 24, the diameter of which is the distance between the contact points 23a and 23b, is superimposed on an image displayed on the display unit 2 (FIG. 7B). This operation resembles an operation to replace the camera lens of a single-lens reflex camera.

When the distance between the contact points 23a and 23b is reduced, the controller 10 displays thumbnail images 25a to 25c, which are obtained by changing representations of images to be taken by the imaging unit 7 for each type of virtual lens optical system, on the display unit 2. Furthermore, the controller 10 changes the representation of the subject image according to the selected thumbnail images 25a to 25c, and displays the resulting image with the changed representations on the display unit 2. Accordingly, the thumbnail image 25a of the subject viewed through a highly sensitive lens, the thumbnail image 25b of the subject viewed through a normal lens, and the thumbnail image 25c of the subject viewed through a monochrome lens are displayed on the display unit 2 (FIG. 7C).

When the photographer selects any one of the thumbnail images (the thumbnail image 25a illustrated in FIG. 7D, for example) and performs an operation to prolong the distance between the contact points 23a and 23b, the thumbnail image is enlarged (FIG. 7E). When the contact points 23a and 23b are separated to a prescribed distance, the thumbnail image disappears and an image to which the same image processing as for an image taken through a highly sensitive lens has been applied is displayed on the display unit 2 (FIG. 7F).

FIG. 8 illustrates an example of a process to change a photography mode.

First, the touch detector 12 detects whether objects have come into contact with the rear touch panel 6 at two points and an operation to bring the objects at the two positions close to each other has been performed (this operation may also be referred to below as a pinch-in) (step S21). Either of these operations has not been performed, the sequence returns to Start.

If the touch detector 12 detects a pinch-in in step S21, the touch detector 12 notifies, through the parameter changing unit 13, the image processing unit 14 of a command to display a photography-mode selection screen (thumbnails 25a to 25c) on the display unit 2. The display controller 15 then displays the photography-mode selection screen on the display unit 2 (step S22).

Next, the touch detector 12 detects whether objects have come into contact with the rear touch panel 6 at two points and an operation to separate the objects at the two positions apart from each other has been performed (step S23) (this operation may also be referred to below as a pinch-out). If a pinch-out has not been detected, the sequence returns to step S22 and the process to display the photography-mode selection screen on the display unit 2 is repeated.

If the touch detector 12 detects a pinch-out in step S23, the touch detector 12 notifies the parameter changing unit 13 of the pinched-out position. The parameter changing unit 13 then changes parameters according the thumbnail image in the photography-mode corresponding to the pinched-out position. The image processing unit 14 creates an image having the same effect as an image that is made visible by light passing through an indicated lens, according to the changed parameter. The display controller 15 displays the image on the display unit 2 in full-screen size (step S24).

When the photographer touches part, of the rear touch panel 6, corresponding to prescribed positions on the display unit 2 and performs an operation like the holding of fingers, the image displayed on the display unit 2 becomes blurred and a list of selectable photography functions is displayed on the display unit 2 as if camera lenses were arranged. In this state, how an image changes through individual lenses becomes clear. When one lens is then selected, the selected lens is touched on the rear touch panel 6, and then an operation like the spreading of fingers is performed for the selected lens, the photography mode can be selected. Accordingly, the photography can reduce lens selection mistakes and can easily capture an intended image.

[(4) Operation During Photography: Example of an Operation to Change Zooming in Single-Hand Holding]

Next, an example of an operation in which the photographer holds the imaging apparatus 1 with a single hand and operates it.

FIG. 9 illustrates an example in which the photographer changes zooming while holding the imaging apparatus 1 with a single hand.

Although, in the above embodiment, examples of operations in which the imaging apparatus 1 is sidewise have been described, even if the imaging apparatus 1 is lengthwise, the same operation is possible. When the orientation of the imaging apparatus 1 is changed to the lengthwise orientation, the orientations of the icons, characters, and the like which have been displayed on the display unit 2 of the imaging apparatus 1 oriented sidewise are changed by 90 degrees. In the description below, an action in which the photographer holds the imaging apparatus 1 with the longer sides of the case 4 of the imaging apparatus 1 being substantially horizontal to the ground as illustrated in FIG. 1 and operates the imaging apparatus 1 with both hands is referred "to both-hand holding", and an action in which the photographer holds the imaging apparatus 1 with the longer sides of the case 4 of the imaging apparatus 1 being substantially perpendicular to the ground as illustrated in FIG. 9 and operates the imaging apparatus 1 with a single hand is referred to "single-hand holding".

When the acceleration sensor 8 detects prescribed acceleration, the image processing unit 14 instructs the display controller 15 to change the orientation of the image to be displayed on the display unit 2. When objects then touch the front touch panel 3 and the rear touch panel 6, two contact points and the indicator 22 are displayed on the display unit 2. When the contact point displayed on the display unit 2 due to the touches of the objects are first moved, the numeric value in the indicator 22 changes and the subject image is displayed on the display unit 2.

Figure 9A:
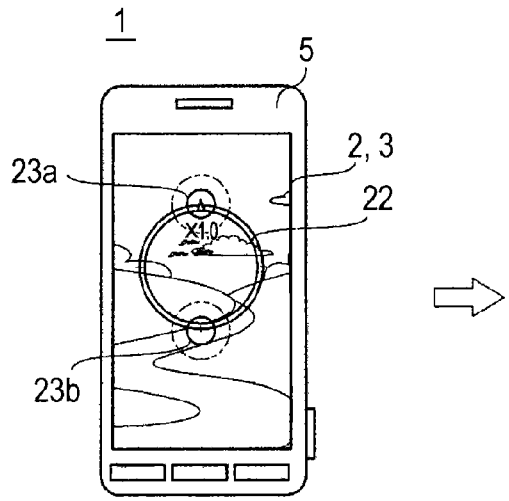
FIGS. 9A-9B illustrate an example in which the photographer changes zooming while holding the imaging apparatus with a single hand.

Specifically, the imaging apparatus 1 operates as follows. When the photographer operates the imaging apparatus 1 in single-hand holding as illustrated in FIG. 9A, the photographer first presses one point on the front touch panel 3 with the thumbnail to display the contact point 23a on the display unit 2. The photographer then presses one point on the rear touch panel 6 with another finger to display the contact point 23b on the display unit 2. In the description below, pressing one point on the front touch panel 3 or rear touch panel 6 with a finger or another object is referred to a single touch. When a single touch is made on the front touch panel 3 and rear touch panel 6, the circular indicator 22, the diameter of which is the distance between contact points 23a and 23b, is displayed on the display unit 2. Even if the fingers are released from the screen, the contact points 23a and 23b remain displayed on the display unit 2; the contact points 23a and 23b are blinking, for example. Since the display colors of the contact points 23a and 23b and the shapes of the icons are changed, the position of the point at which a finger has first brought into contact can be visually recognized with ease.

Figure 9B:
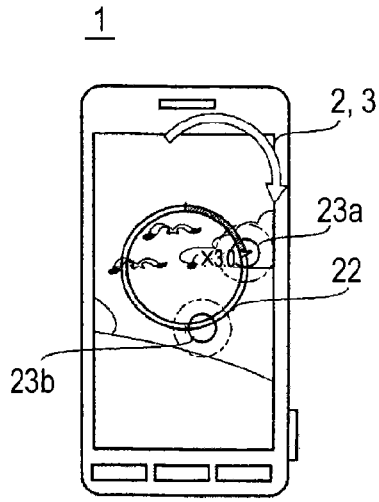

Next, when the photographer performs an operation to rotate the indicated part of the indicator 22 clockwise as illustrated in FIG. 9B, the indicated part being displayed at the position of the contact point 23a, the image to be displayed within the indicator 22 is zoomed in and the zoomed-in image is displayed on the display unit 2. When the photographer performs an operation to rotate the indicated part of the indicator 22 counterclockwise, the image to be displayed within the indicator 22 is zoomed out and the zoomed-out image is displayed on the display unit 2. Since the photographer operates the imaging apparatus 1 in the single-hand holding, only the contact point 23a moves on the screen, and the position of the contact point 23b does not move. Accordingly, even in a case of single-hand holding, the photographer can easily perform the zoom-in or zoom-out operation.

Figure 10:
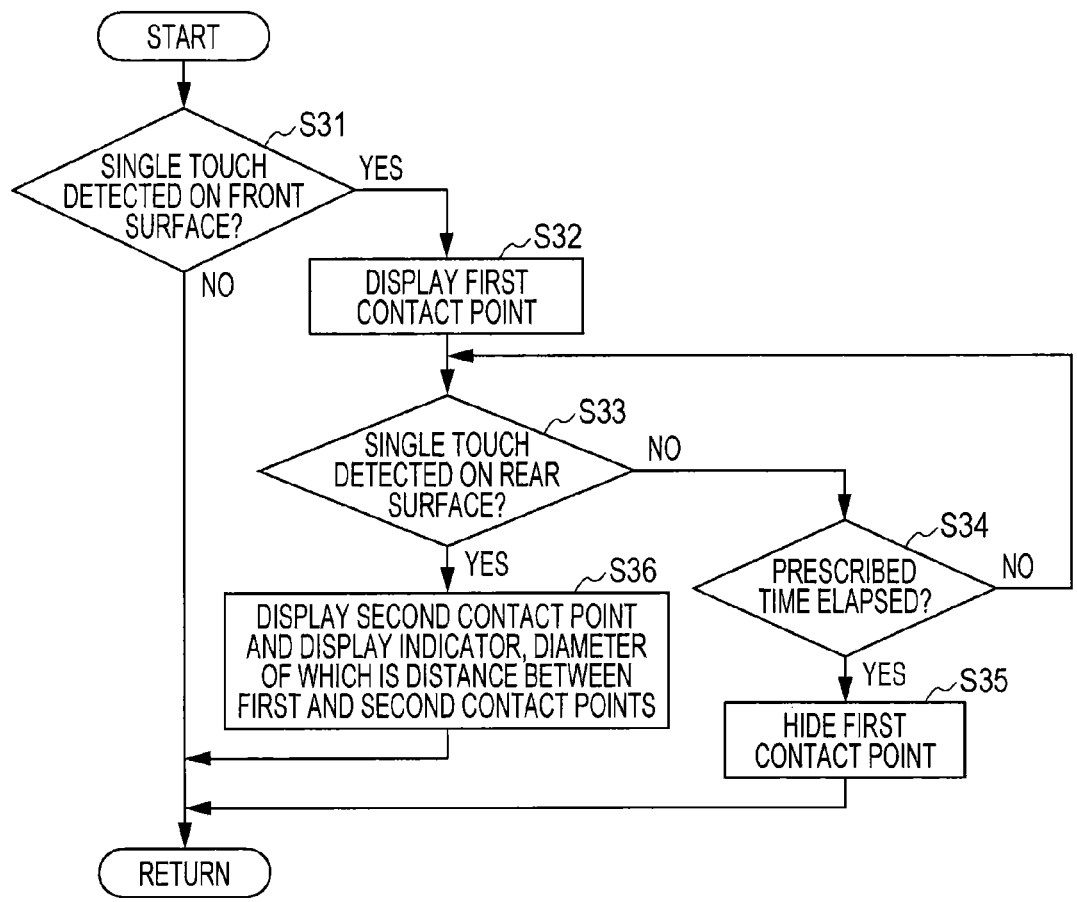
FIG. 10 is a flowchart illustrating an example of a process in which the photographer in the embodiment of this disclosure makes a command to the front surface and rear surface of the imaging apparatus to display an indicator.

FIG. 10 illustrates an example of a process to change zooming while holding the imaging apparatus 1 with a single hand.

First, the touch detector 12 detects whether a single touch has been detected on the front touch panel 3 (step S31). If the touch detector 12 decides that a single touch has not been detected on the front touch panel 3, the processing is terminated.

If the touch detector 12 decides that a single touch has been detected on the front touch panel 3, the image processing unit 14 displays the contact point 23a (first contact point) on the display unit 2 through the display controller 15 (step S32). The touch detector 12 then decides whether a single touch has been detected on the rear touch panel 6 (step S33).

If the touch detector 12 decides that a single touch has not been detected on the rear touch panel 6, the image processing unit 14 decides whether a prescribed time has elapsed after the contact point 23a was displayed (step S34). If the image processing unit 14 decides that the prescribed time has not elapsed, the sequence is returned to the step S33 and the processing is continued. If the image processing unit 14 decides that the prescribed time has elapsed, the image processing unit 14 hides the contact point 23a, which has been displayed on the display unit 2, and terminates the processing (step S35).

If the touch detector 12 decides in step S33 that a single touch has been detected on the rear touch panel 6, the image processing unit 14 displays the contact point 23b (second contact point) on the display unit 2 through the display controller 15 and also displays the indicator 22, the diameter of which is the distance between the contact points 23a and 23b, on the display unit 2 (step S36).

Referring to FIGS. 9 and 10, an example in which the photographer presses a single point on the front touch panel 3 and then presses a single point on the rear touch panel 6 to display the contact points 23a and 23b on the display unit 2 has been described. However, the photographer may also press a single point on the rear touch panel 6 before pressing a single point on the front touch panel 3 to display the contact points 23a and 23b on the display unit 2.

The image processing unit 14 or display controller 15 can decide a change from both-hand holding to single-hand holding or a change from single-hand holding to both-hand holding according to the value of the acceleration of gravity received from the acceleration sensor 8. It is also possible to explicitly change between both-hand holding and single-hand holding according to, for example, the number of times the photographer has struck the case 4 with fingers. A seamless switchover then becomes possible between an operation carried out with two fingers when both-hand holding is decided and an operation carried out with a single finger when single-hand holding is decided.

[(5) Operation During Photography: First Operation Example in which the Zooming of an Image to be Displayed at an Edge of the Screen is Changed]

Next, an example of an operation in which, for example, an image at an edge of the display unit 2 is zoomed.

In an operation such as zooming in which the indicator 22 described above is used, a subject image at an edge of the display unit 2 may not be well specified. Therefore, operations as illustrated in FIGS. 11 and 12 are performed so that even an image at an edge of the screen can be easily zoomed or operated for another purpose.

FIG. 11 illustrates a first operation example in which the zooming of an image to be displayed at an edge of the screen is changed.

As illustrated in FIG. 11A, the photographer touches the rear touch panel 6 with two fingers to display the contact points 23a and 23b and indicator 22 on the display unit 2. The photographer then slides the fingers in contact with the rear touch panel 6 to bring the contact points 23a and 23b close to an edge of the screen of the display unit 2. The subject display area 2a moves in a direction opposite to the direction of the motion of the contact points 23a and 23b, and an area 2c outside the subject display area 2a is also displayed (FIG. 11B).

At that time, the image at the edge of the subject display area 2a is displayed at the center of the indicator 22. When the contact points 23a and 23b are brought close to the edge of the subject display area 2a, the display controller 15 moves the image of the subject including the edges of the subject display area 2a toward the center of the display unit 2. When the photographer performs an operation to rotate the indicator 22 clockwise, therefore, the image at the center of the indicator 22 is zoomed in and the zoomed-in image is displayed (FIG. 11C). The operation performed on the indicator 22 is the same as the operation illustrated in FIG. 5 referred to above.

[(6) Operation During Photography: Second Operation Example in which Zooming is Changed to an Edge of the Screen]

FIG. 12 illustrates a second operation example in which the zooming of an image to be displayed at an edge of the screen is changed.

FIG. 12A is the same as the FIG. 11A, so its explanation will be omitted. Next, the photographer slides the fingers in contact with the rear touch panel 6 to bring the contact points 23a and 23b close to an edge of the screen of the display unit 2. When the contact points 23a and 23b are brought close to an edge of the subject display area 2a, the display controller 15 carries out control so that the indicator 22 is separated apart from the two contact points and moves the indicator 22 in the direction in which the contact points 23a and 23b have moved.

Therefore, the contact points 23a and 23b stay at the edge of the screen with the distance between them left unchanged, but part of the indicator 22 extends off the screen and the indicator 22 is displayed as if part of it were missing (FIG. 12B). In this state, the contact points 23a and 23b are not on the edge of the indicator 22. When the photographer performs an operation to rotate the two fingers, however, the contact points 23a and 23b also rotate and the indicator 22 is displayed while rotating at a rotational speed at which the contact points 23a and 23b rotate. Accordingly, even an image at an edge of the screen can undergo zooming-in and other operations according to the position of the indicator 22.

According to the imaging apparatus 1 in the embodiment described above, the viewfinder is displayed on the screen little by little in conjunction with the operation by a finger of the photographer, so comfortable operability can be achieved as if the cover were actually opened. A small lens cover attached to the lens of the imaging unit 7 may be moved together.

Since the imaging function is activated when the rear touch panel 6 is operated, the imaging function can be quickly activated regardless of the operation that is being performed on the imaging apparatus 1, so the photographer does not miss a photo opportunity.

As for operations during photography, finer adjustments are possible when compared with pinch-in or pinch-out operations that are generally carried out on touch panels at present. An operation to zoom to a desired location can also be easily performed.

The photographer can change the photography mode intuitively in the same way as when the photographer exchanges the lens of a single-lens reflex camera or the like. Since thumbnail images processed for individual lenses are displayed as a list on the display unit 2, the photographer can easily grasp an effect to be added to an image captured by using a substituted lens.

2. Variation

Incidentally, the photographer does not need to drag an object from the left edge of the rear touch panel 6 to the right edge as illustrated in FIG. 3. If, for example, the photographer touches the left edge of the display unit 2 (right edge of the rear touch panel 6) with a finger and drags the finger to a point near the center of the display unit 2, it can be decided that the photographer attempts to activate the imaging function. If the dragged distance is a prescribed value or more, therefore, the remaining area may be opened quickly. The boundary line between the application display area 2b and the subject display area 2a does not necessarily have to be displayed while being moved at a fixed speed.

After having performed an operation to rotate the indicator 22, the photographer may touch a portion other than the portions with which the two fingers in contact to reset the operation by the indicator 22. This eliminates time and effort that would otherwise be spent returning the indicator 22 to its initial state, increasing operability.

Although, in the embodiment described above, the imaging apparatus 1 having only the rear touch panel 6 has been described, the case 4 may have the rear touch panel 6 and a display unit on the rear surface so that images are displayed on the front surface and rear surface of the case 4.

In the embodiment described above, the indicator 22 has been rotated with two fingers. Once the indicator 22 is displayed on the display unit 2, however, the center of the indicator 22 may be fixed and the indicator 22 may be operated with a single finger. In this case, even if one of the two fingers is released from the rear touch panel 6, the operation by the photographer is not affected.

Although a series of processes in the embodiment described above can be executed by hardware, it can also be executed by software. When the series of processes is executed by software, the series of processes can be executed by a computer in which programs constituting the software have been embedded in dedicated hardware or by a computer in which programs executing various functions have been installed. For example, the series of processes can be executed by installing programs constituting desired software in, for example, a general-purpose personal computer.

A recording medium storing program code of software that implements the functions in the embodiment described above may be supplied to the imaging apparatus or information processing terminal. It will be appreciated that the functions can also be executed when a computer (or a CPU or another control unit) reads out and executes the program code stored in the storage medium.

In this case, a flexible disk, hard disk, optical disk, magneto-optical disk, CD-ROM, CD-R, magnetic tape, non-volatile memory card, or ROM can be used as the recording medium used to supply the program code.

When the computer reads outs and executes the program code, the functions in the embodiment described above are implemented. An OS running on the computer and the like execute part or all of the actual processes in response to instructions from the program code. A case in which the functions in the embodiment described above are executed by the processing is also included.

It will be apparent that this disclosure is not limited to the embodiment described above and other various types of application examples and variations are possible without departing from the intended scope of this disclosure described in the claims. That is, it will be understood by those skilled in the art that various modification and combinations and other embodiments may be derived from design or other elements within the range of the claims or an equivalent range of the claims.

This enclosure can also have structures as described below.

(1) Imaging apparatus that has an imaging unit that fetches image light of a subject to which a lens optical system is oriented and outputs an image of the subject, a display unit, provided on a first surface of a case, that displays the image of the subject, a second-surface detector, provided on a second surface of the case, that detects a contact point with which an object is in contact, the second surface being a rear surface opposite to the first surface, and a controller that receives a distance between two contact points of at least two objects and positions of the two contact points from the second-surface detector and gives an operation command to the imaging unit according to changes in the received distance and positions so that an image to be displayed on the display unit is changed.

(2) Imaging apparatus described in (1) above in which the controller performs control so that a first display area displayed on the display unit is contracted with the imaging unit placed in a non-operated state and a second display area in which to display the subject image on the display unit is expanded, in a direction in which the contact point moves on the second-surface detector.

(3) Imaging apparatus described in (1) or (2) above in which the controller carries out control so that the second display area is expanded in a direction in which the two contact points are separated apart from each other and that the second display area is contracted with the imaging unit 7 placed in the non-operated state.

(4) Imaging apparatus described in (1) above in which the controller performs control so that an indicator used to adjust a photography parameter is displayed on the display unit according to the two contact points, a display in the indicator is changed according to a direction in which the two contact points rotate, and an image of the subject that is obtained by zooming in or out an image present at a position near the center between the two contact points is displayed on the display unit.

(5) Imaging apparatus described in (1) above in which the controller performs control so that when one or two contact points are detected, an indicator used to adjust a photography parameter is left displayed on the display unit with a fixed point taken as the center of the indicator, the fixed point being the position of the one contact point or the center between the two contact points, a display in the indicator is changed according to a direction in which the two contact points rotate, and an image of the subject that is obtained by zooming in or out an image present at a position near the center between the two contact points is displayed on the display unit.

(6) Imaging apparatus described in (1) above that further has an acceleration sensor that detects acceleration applied to the case, and a first-surface detector, disposed on the first surface, that detects a contact point with which an object is brought into contact;

when the acceleration sensor detects a prescribed acceleration, a command to change the orientation of an image to be displayed on the display unit is given, and the two contact points and the indicator are displayed on the display unit when objects come into contact with the second-surface detector and the first-surface detector, and a numeric value in the indicator is changed and the image of the subject is displayed accordingly on the display unit when one of the two contact points, which is displayed when an object first makes a touch, moves.

(7) Imaging apparatus described in (1) or (2) above in which when the two contact points are brought close to an edge of the second display area, the image of the subject including edges of the second display area is moved toward the center of the display unit.

(8) Imaging apparatus described in (1) or (2) above in which when the two contact points are brought close to an edge of the second display area, the indicator is separated apart from the two contact points and is moved in the direction in which the two contact points have moved.

(9) Imaging apparatus described in (1) above in which when the distance between the two contact points is reduced, the controller displays thumbnail images, which are obtained by changing representations of images to be taken by the imaging unit for each type of virtual lens optical system, on the display unit, changes the representation of the subject image according to a selected thumbnail image, and displays a resulting image with the changed representation on the display unit.

(10) Imaging apparatus described in any one of (1) to (9) above in which the lens optical system is placed next to the second detector disposed on the second surface or placed inside the second-surface detector.

(11) Imaging method including fetching image light of a subject to which a lens optical system is oriented and causing an imaging unit to output an image of the subject, causing a display unit provided on a first surface of a case to display the image of the subject, detecting a contact point at which an object is brought into contact with a second-surface detector provided on a second surface of the case, the second surface being a rear surface opposite to the first surface, and giving an operation command to the imaging unit according to changes in the distance between two contact points of at least two detected objects and positions of the two detected points so that an image to be displayed on the display unit is changed.

(12) Information processing terminal that has an imaging unit that fetches image light of a subject to which a lens optical system is oriented and outputs an image of the subject, a display unit, provided on a first surface of a case, that displays the image of the subject when an imaging function using the imaging unit is enabled, a second-surface detector, provided on a second surface of the case, that detects a contact point with which an object is in contact, the second surface being a rear surface opposite to the first surface, and a controller that receives a distance between two contact points of at least two objects and positions of the two contact points from the second-surface detector when the imaging function is enabled and gives an operation command to the imaging unit according to changes in the received distance and positions so that an image to be displayed on the display unit is changed.

(13) Program that causes a computer to execute a procedure for fetching image light of a subject to which a lens optical system is oriented and causing an imaging unit to output an image of the subject, a procedure for causing a display unit provided on a first surface of a case to display the image of the subject.

a procedure for detecting a contact point at which an object is brought into contact with a second-surface detector provided on a second surface of the case, the second surface being a rear surface opposite to the first surface, and a procedure for giving an operation command to the imaging unit according to changes in the distance between two contact points of at least two detected objects and positions of the two detected points so that an image to be displayed on the display unit is changed.

The invention claimed is:

1. An information processing apparatus comprising:
an imaging circuit that captures an image of a subject;
a display, provided at a first side of the information processing apparatus, that displays the captured image of the subject;
a first touch panel, provided at a second side of the information processing apparatus, the second side corresponding to an external surface of the information processing apparatus and being opposite to the first side; and
circuitry configured to
receive a first output from the first touch panel corresponding to a first touch input, and
in response to the first output from the first touch panel indicating that the first touch input includes a first contact point and a second contact point that are concurrently detected, control the display based on the first contact point and the second contact point,
wherein when the circuitry determines that the first contact point and the second contact point are within a predetermined portion of the first touch panel and then a distance between the first contact point and the second contact point is reduced, the circuitry is further configured to
control the display to display thumbnail images together with the captured image, the thumbnail images being obtained by processing the captured image based on different photography modes,
receive a second output from the first touch panel corresponding to a second touch input that selects one of the displayed thumbnail images, and
control the display to display a processed captured image obtained by processing the captured image based on one of the photography modes that corresponds to the selected thumbnail image.

2. The information processing apparatus of claim 1, wherein the circuitry is configured to
receive a third output from the first touch panel corresponding to a third touch input, and
in response to the third output from the first touch panel indicating that the third touch input corresponds to a drag operation, output a command to activate the imaging circuit based on the drag operation.

3. The information processing apparatus of claim 2, wherein the circuitry is configured to control the display to contract a first display area with the imaging circuit placed in a non-activated state and expand a second display area in which to display the image of the subject in a direction corresponding to the drag operation.

4. The information processing apparatus of claim 2, wherein the circuitry is configured to determine a distance of the drag operation, compare the distance to a predetermined threshold value, and output the command to activate the imaging circuit when the distance of the drag operation exceeds the predetermined threshold value.

5. The information processing apparatus of claim 1, wherein the circuitry is configured to
receive a fourth output from the first touch panel corresponding to a fourth touch input before the imaging circuit is activated, and
in response to the fourth output from the first touch panel indicating that the fourth touch input includes a third contact point and a fourth contact point that are concurrently detected, output a command to activate the imaging circuit based on a change in a distance between the third contact point and the fourth contact point.

6. The information processing apparatus of claim 5, wherein the circuitry is configured to compare the change in the distance to a predetermined threshold value, and output the command to activate the imaging circuit when the change in the distance exceeds the predetermined threshold value.

7. The information processing apparatus of claim 5, wherein the circuitry is configured to control the display to contract a first display area with the imaging circuit placed in a non-activated state and expand a second display area in which to display the image of the subject in a direction corresponding to an increase in the distance.

8. The information processing apparatus of claim 1, wherein the circuitry is further configured to control the display to display an indicator, and a fixed point is located at a center of the indicator and is defined as a center position between the first contact point and the second contact point.

9. The information processing apparatus of claim 1, wherein the first touch panel is configured to detect a rotation of the first contact point with respect to the second contact point, and the circuitry is configured to control the display to display an indicator and change the indicator according to the rotation of the first contact point with respect to the second contact point.

10. The information processing apparatus of claim 1, wherein the circuitry is configured to
receive a fifth output from the first touch panel corresponding to a fifth touch input, and
in response to the fifth output from the first touch panel indicating that the fifth touch input includes a contact point, control the display to display an indicator to adjust an imaging parameter based on the contact point.

11. The information processing apparatus of claim 10, wherein a fixed point is located at a center of the indicator and is defined as a position corresponding to the contact point.

12. The information processing apparatus of claim 10, wherein the first touch panel is configured to detect movement of the contact point at a position corresponding to the indicator, and the circuitry is configured to control the display to change the indicator according to the movement of the contact point.

13. The information processing apparatus of claim 10, wherein the first touch panel is configured to detect movement of the contact point at a position corresponding to the indicator, and the circuitry is configured to control the display to enlarge or reduce the size of the image of the subject based on the movement of the contact point.

14. The information processing apparatus of claim 1, further comprising:
an acceleration sensor configured to detect acceleration applied to the information processing apparatus, wherein
the circuitry is configured to output a command to change an orientation of the image of the subject displayed on the display when the acceleration sensor detects a prescribed acceleration.

15. The information processing apparatus of claim 1, wherein when the circuitry determines that the first contact point and the second contact point are brought close to an edge of the first touch panel, the circuitry is configured to control the display to move the image of the subject toward a center of the display.

16. The information processing apparatus of claim 1, wherein the circuitry is further configured to control the display to display an indicator, and when the circuitry determines that the first contact point and the second contact point are brought close to an edge of the first touch panel, the circuitry is configured to control the display to move the indicator in a direction corresponding to the movement of the first contact point and the second contact point.

17. The information processing apparatus of claim 1, wherein the first touch panel is configured to detect a rotation of the first contact point with respect to the second contact point, and the circuitry is configured to control the display to enlarge or reduce the size of the image of the subject based on the rotation of the first contact point with respect to the second contact point.

18. The information processing apparatus of claim 1, wherein the circuitry is configured to control the display to display an indicator, and set a size of the indicator based on a distance between the first contact point and the second contact point.

19. The information processing apparatus of claim 1, wherein the second touch input that selects one of the displayed thumbnail images includes a fifth contact point and a sixth contact point, and the fifth contact point and the sixth contact point overlap the selected one of the displayed thumbnail images and then a distance between the fifth contact point and the sixth contact point is increased.

20. The information processing apparatus of claim 1, further comprising a second touch panel provided at the first side of the information processing apparatus,
wherein the circuitry is configured to:
receive a sixth output from the first touch panel corresponding to a sixth touch input,
receive a seventh output from the second touch panel corresponding to a seventh touch input,
determine a reference point on the image of the subject based on a first one of the sixth touch input and the seventh touch input prior to receiving a second one of the sixth touch input and the seventh touch input, and
control the display to enlarge or reduce a size of the image of the subject based on movement of the second one of the sixth touch input and the seventh touch input with respect to the reference point.

21. A method performed by an information processing apparatus, the method comprising:
capturing, by an imaging circuit, an image of a subject;
displaying, by a display provided at a first side of the information processing apparatus, the captured image of the subject;
detecting, by a touch panel provided at a second side of the information processing apparatus, at least one touch input, the second side corresponding to an external surface of the information processing apparatus and being opposite to the first side;
receiving, at circuitry of the information processing apparatus, a first output from the touch panel corresponding to a first touch input,
in response to the first output from the touch panel indicating that the first touch input includes a first contact point and a second contact point that are concurrently detected, controlling the display based on the first contact point and the second contact point,
wherein when the first contact point and the second contact point are within a predetermined portion of the touch panel and then a distance between the first contact point and the second contact point is reduced, the method further comprises:
controlling the display to display thumbnail images together with the captured image, the thumbnail images being obtained by processing the captured image based on different photography modes;
receiving a second output from the touch panel corresponding to a second touch input that selects one of the displayed thumbnail images; and
controlling the display to display a processed captured image obtained by processing the captured image based on one of the photography modes that corresponds to the selected thumbnail image.

22. The method of claim 21, wherein the second touch input that selects one of the displayed thumbnail images includes a fifth contact point and a sixth contact point, and the fifth contact point and the sixth contact point overlap the selected one of the displayed thumbnail images and then a distance between the fifth contact point and the sixth contact point is increased.

23. A non-transitory computer-readable medium including computer program instructions, which when executed by an information processing apparatus, cause the information processing apparatus to perform a method comprising:
capturing an image of a subject;
displaying, by a display provided at a first side of the information processing apparatus, the captured image of the subject;
detecting, by a touch panel provided at a second side of the information processing apparatus, at least one touch input, the second side corresponding to an external surface of the information processing apparatus and being opposite to the first side;
receiving a first output from the first touch panel corresponding to a first touch input,
in response to the first output from the touch panel indicating that the first touch input includes a first contact point and a second contact point that are concurrently detected, controlling the display based on the first contact point and the second contact point,
wherein when the first contact point and the second contact point are within a predetermined portion of the touch panel and then a distance between the first contact point and the second contact point is reduced, the method further comprises:
controlling the display to display thumbnail images together with the captured image, the thumbnail images being obtained by processing the captured image based on different photography modes;
receiving a second output from the touch panel corresponding to a second touch input that selects one of the displayed thumbnail images; and
controlling the display to display a processed captured image obtained by processing the captured image based on one of the photography modes that corresponds to the selected thumbnail image.

24. The non-transitory computer-readable medium of claim 23, wherein the second touch input that selects one of the displayed thumbnail images includes a fifth contact point and a sixth contact point, and the fifth contact point and the sixth contact point overlap the selected one of the displayed thumbnail images and then a distance between the fifth contact point and the sixth contact point is increased.

* * * * *